United States Patent
Kesper

(10) Patent No.: US 9,608,241 B2
(45) Date of Patent: Mar. 28, 2017

(54) BATTERY CELL FOR A BATTERY, ESPECIALLY FOR A TRACTION BATTERY

(71) Applicant: Hoppecke Batterien GmbH & Co. KG, Brilon (DE)

(72) Inventor: Heinrich Kesper, Willingen (DE)

(73) Assignee: Hoppecke Batterien GmbH & Co. KG, Brilon (DE)

( * ) Notice: Subject to any disclaimer, the term of this patent is extended or adjusted under 35 U.S.C. 154(b) by 118 days.

(21) Appl. No.: 14/804,364

(22) Filed: Jul. 21, 2015

(65) Prior Publication Data

US 2016/0020440 A1   Jan. 21, 2016

(30) Foreign Application Priority Data

Jul. 21, 2014   (EP) .................... 14177887

(51) Int. Cl.
  *H01M 2/02* (2006.01)
  *H01M 2/06* (2006.01)
  *H01M 2/04* (2006.01)
  *H01M 2/30* (2006.01)

(52) U.S. Cl.
  CPC ........... *H01M 2/06* (2013.01); *H01M 2/024* (2013.01); *H01M 2/043* (2013.01); *H01M 2/305* (2013.01); *H01M 2/0473* (2013.01); *H01M 2220/20* (2013.01)

(58) Field of Classification Search
  CPC .. H01M 2220/20; H01M 2/024; H01M 2/043; H01M 2/0473; H01M 2/06; H01M 2/305
  See application file for complete search history.

(56) References Cited

U.S. PATENT DOCUMENTS 6,312,852 B1 *  11/2001   Wagner .................. H01M 2/06
                                                     429/163

FOREIGN PATENT DOCUMENTS

| DE | 24 14 508 A1 | 10/1976 |
| GB | 2 026 761 A | 2/1980 |
| WO | 90/05999 | 5/1990 |

* cited by examiner

*Primary Examiner* — Patrick Ryan
*Assistant Examiner* — Ben Lewis
(74) *Attorney, Agent, or Firm* — Gudrun E. Huckett

(57) ABSTRACT

A battery cell has an electrode plate pack arranged in a casing and provided with a terminal of lead material that extends through a cover opening of the casing cover of the casing. A plastic material cap is placed onto the terminal. The cap has an inner side provided with a circumferentially extending shoulder and an exterior side provided with a circumferentially extending support web. A sealing element is arranged at the inner side of the cap between cap and terminal and is positionally fixed by the circumferentially extending shoulder. The casing cover rests on the circumferentially extending support web. Cap and casing cover are welded to each other. A threaded sleeve of nonferrous metal is embedded in the lead material of the terminal and is aligned with an insertion opening of the cap. The threaded sleeve receives a connecting screw to be passed through the insertion opening.

9 Claims, 7 Drawing Sheets

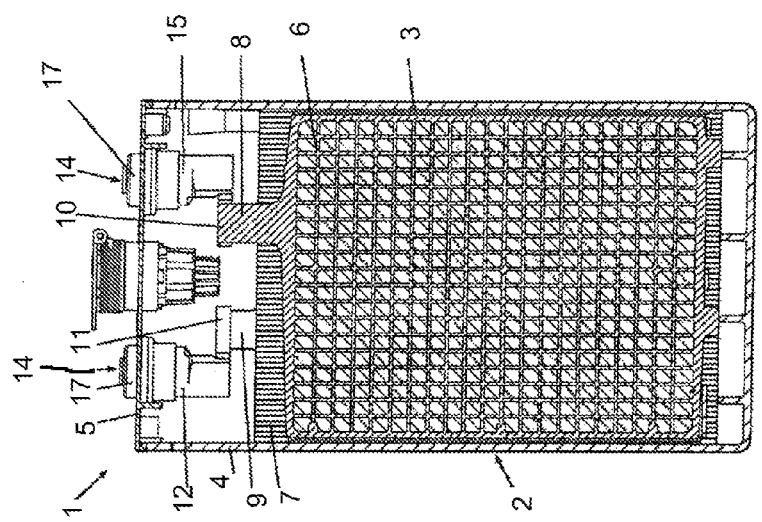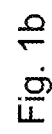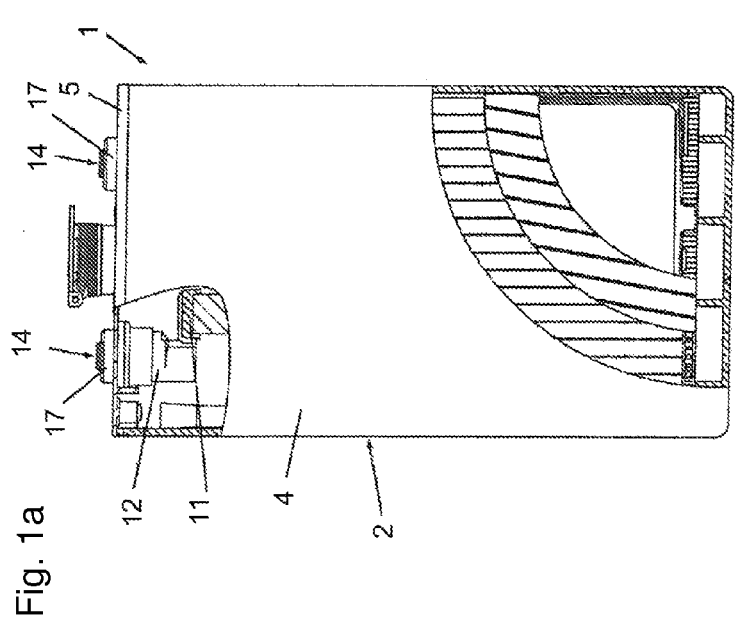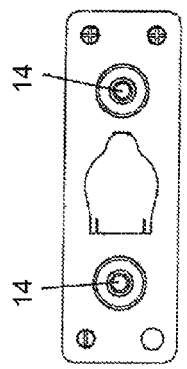

Fig. 4
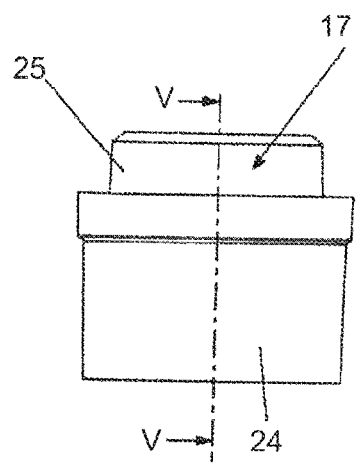
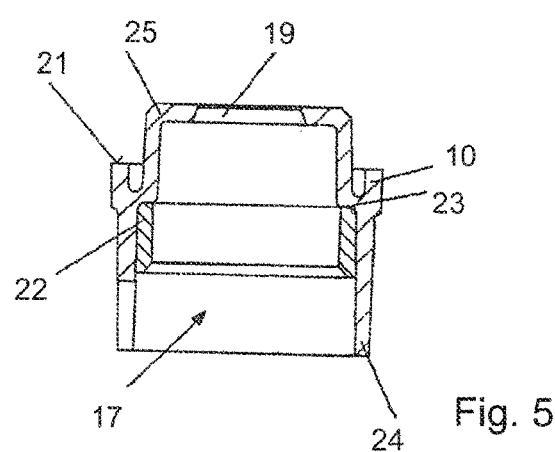
Fig. 5
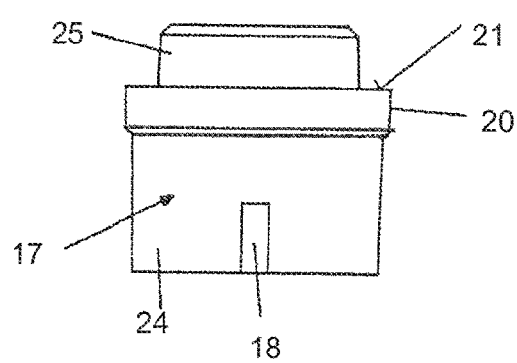
Fig. 6

BATTERY CELL FOR A BATTERY, ESPECIALLY FOR A TRACTION BATTERY

BACKGROUND OF THE INVENTION

The invention relates to a battery cell for a battery, especially for a traction battery, comprising a casing box that is open at one side and a casing cover that closes off the open side of the casing box in a fluid-tight way as well as comprising an electrode plate pack arranged within the casing box that is provided with a terminal that is passed through an opening provided within the casing cover.

Battery cells of the aforementioned kind, on the one hand, and traction batteries that comprise a plurality of battery cells electrically connected to each other, on the other hand, are well known in the prior art so that supporting documentation by printed publications is not required in this context.

As non-stationary batteries, traction batteries are typically employed in automotive technology, for example, in forklifts, elevating trucks and the like. Known traction batteries comprise a plurality of battery cells that are electrically connected to each other. Typically, 12 cells (for 24 V), 24 cells (for 48 V) or 40 cells (for 80 V) are employed as a function of the desired output voltage.

In this context, each battery cell comprises a cell housing that provides a casing box; the casing box, on the one hand, contains an electrolyte as well as alternatingly arranged positive and negative electrode plates, on the other hand, that together create an electrode plate pack. In the final mounted state, the open casing box side of the cell housing is closed off by a casing cover so as to be electrolyte-tight.

For electric connection and/or contacting of the battery cell, terminals are provided which originate at the electrode plate pack and are passed through cover openings provided within the casing cover. In this context, for the purpose of an electrolyte-tight lead-through of the terminals through the cover openings, the cover openings are provided with a soft-elastic sealing sleeve which, in the final mounted state, contacts and rests on the exterior of the respective terminal. Accordingly, a sealing action between the casing cover, on the one hand, and the terminals, on the other hand, is realized as a result of the sealing sleeves, wherein each terminal is provided with a sealing sleeve.

Even though the afore described construction has proven successful in day-to-day practical use, it has its disadvantages; in particular, the sealing action between sealing sleeve, on the one hand, and the associated terminal, on the other hand, is not satisfactory over the course of time. This is so because the geometric dimensions of the individual components, in particular of the terminals, of the casing cover, and of the terminal passages provided therein, have tolerances caused by the production process and therefore can vary. For example, even though the spacing between the terminals provided by the electrode plate pack is predetermined, it varies however. sometimes by a few millimeters; in the final mounted state, this may lead to sections of the terminals being forced more strongly against the respective surrounding sealing sleeve while other terminal sections are less strongly pushed against the respective associated sealing sleeve so that different sealing effects relative to the circumferential diameter of a terminal are generated. Moreover, the terminals also can be oriented such that they are displaced relative to each other like skew lines; this may also lead to non-uniform contacting of the respective sealing sleeve on the associated terminal. This also may cause undesirable leakages already after only a very short period of use of the battery cell.

One more thing has to be taken into consideration in this context. As an electrolyte, sulfuric acid is typically used, in particular in case of lead acid batteries. In this context, there is a particular problem in that sulfuric acid is characterized by a relatively great capillary action so that the electrolyte over time will pass even through smallest cracks and gaps. Possible imprecision in regard to the contacting action of the sealing sleeve on the associated terminal therefore compounds the problem of leakage.

In the prior art further configurations are known. For example, U.S. Pat. No. 6,312,852 B1 discloses a battery with a cover that is provided with monolithic, integrally formed sleeves for the purpose of providing a passage for the terminals therethrough. In this context, the sleeves are embodied with formation of a flexible connection so as to be movable relative to the actual casing cover. In the final mounted state, the sleeves each receive a connector bushing that is either embedded within the sleeve or, with intermediate positioning of a potted epoxide resin, is connected with the sleeve.

WO 90/05999 concerns a passage for a terminal that is characterized by several sealing elements. In this context, a union nut is employed which forces the sealing elements against the respective sealing surface interacting therewith.

GB 2 026 761 A1 concerns a method for producing a terminal post lead-through for batteries. According to this method, a terminal post is embedded in a body of thermoplastic material that subsequently is annularly welded to the cover of the battery. As a welding method, a mirror (hot plate) welding process is used wherein the cover is simultaneously fused to the housing and the body.

DE 25 14 508 concerns a terminal post sealing device according to which a sealing ring and an insulating and compression sleeve are arranged on a terminal post shaft. Moreover, a terminal nut is provided by means of which the insulating sleeve and the sealing ring are tightly pressed onto the terminal post base. The insulating sleeve is positioned in such a way that with its sealing area it is always located below the electrolyte level within the battery cell.

Based on the afore described, it is the object of the invention to provide a battery cell that provides, due to its construction, an improved sealing action between the casing cover and the terminal.

SUMMARY OF THE INVENTION

In accordance with the invention, this problem is solved in that a battery cell of the aforementioned is characterized in that the terminal carries a cap which provides at the side facing the terminal a sealing element and at the side which is facing the casing cover is welded to the casing cover.

According to the construction of the present invention, a cap is used, wherein each terminal is provided with a cap. In the final mounted state, the terminal extends through the respective cover opening provided within the casing cover with interposition of the associated cap. In this context, the cap has two functions. On the one hand, it provides a sealing element associated with the terminal. Between the cap, on the one hand, and the terminal, on the other hand, there is therefore a sealing element arranged that ensures an electrolyte-tight contacting of the terminal at the inner surface of the cap. On the other hand, the cap, relative to the casing, is fused or welded to the casing cover, i.e., it is connected by material fusion to the casing cover, and is therefore electrolyte-tightly joined with the casing cover.

The special advantage of the configuration according to the invention resides in that the cap which is serving as an auxiliary element compensates possibly present manufacturing tolerances in relation to the casing cover, wherein this compensation, in contrast to the aforementioned prior art, does not concern the position of the sealing element but only the position of the cap relative to the casing cover. After alignment has taken place, the cap is essentially positioned free of load and free of tension relative to the casing cover, and welding (fusing) of cap and casing cover can be carried out. In contrast to the prior art, possible positional tolerances are corrected by a weld seam that is to be positioned differently and not corrected such that the relative position of the sealing element relative to the corresponding terminal is changed.

As a result of the configuration according to the invention, a permanently reliable sealing action between the sealing element and the terminal results, i.e., between the cap that is supporting the sealing element and the terminal, on the one hand, as well as between the cap and the casing cover, on the other hand, wherein the seal tightness between cap and casing cover is generated by fusing or welding.

The afore described construction of the terminal sealing action provides moreover the advantage that the terminals can be produced according to the so-called COS method (cast-on-strip method). According to this method, liquid lead is filled into a casting mold wherein the casting mold is the negative copy of the terminal as well as of the cell connector carrying the terminal. Pre-manufactured electrodes are immersed, with their contact tabs leading, into the liquid lead contained in the casting mold and the lead material is allowed to solidify. As a result of this method, a one-piece (monolithic) component, embodied monolithic with the contact tabs of the electrodes, is produced that provides the cell connector connecting the contact tabs of the individual electrodes with each other as well as the terminal that is arranged monolithically on the cell connector. The thus prepared electrodes can then be introduced together with the terminal integrally formed thereon into the casing box of the casing.

The manufacture according to the COS method is advantageous in regard to handling and is moreover inexpensive. The terminal sealing action proposed by the invention can be combined in an advantageous way with electrodes that are produced according to the COS method so that in this respect a synergetic effect results because the configuration according to the invention not only provides an improved terminal sealing action but enables also a simple and inexpensive manufacture.

According to a preferred embodiment of the invention, it is provided that the cap is provided at the outer circumference with a circumferentially extending support web on which the casing cover is resting. With the support web, the cap engages underneath the edge of the cover opening which is provided in the casing cover as a passage for leading through the terminal. Accordingly, the casing cover is provided with a support. In this context, the support web with its end face which is facing the casing cover is preferably contacting the casing cover. On the one hand, in this way additional stabilization of cap and casing cover is achieved; on the other hand, possible positional tolerances between the cap and the cover opening can be compensated in an improved way because fusing or welding is carried out preferably at the bottom side of the casing cover between support web and casing cover.

The cap and the sealing element are preferably embodied as a monolithic one-piece component. This simplifies a manufacture, in particular assembly of the battery cell according to the invention.

The cap is comprised of plastic material, preferably of polypropylene. Also, the casing cover of the battery cell is comprised of polypropylene which simplifies fusing or welding of the cap to the casing cover.

As a sealing element, an O-ring or a sealing sleeve can be used. The sealing element is comprised of plastic material, preferably a thermoplastic elastomer, which provides particularly good sealing properties.

For providing a monolithic one-piece component, the sealing element can be injection-molded into the cap or can be glued into the cap.

According to a further feature of the invention, the cap comprises two parts, i.e., a first part which is fused or welded to the casing cover as well as a second part which is axially spaced from the first part, wherein between the first part and the second part an elastically configured connecting bridge is formed. According to this construction, the second part of the cap is capable of performing a relative movement relative to the first part of the cap, i.e., relative to the part of the cap that is fused or welded to the casing cover, in axial direction, i.e., in vertical direction of the cap or height direction of the cap. This relative mobility of the second part of the cap enables in an advantageous way a length compensation which aids in preventing so-called stress whitening on the casing cover.

Over the service life of a battery, intercrystalline corrosion may lead to growth of the positive plates in vertical (height) direction. As a result of this, the terminals of the positive plates will push from below against the casing cover. This can cause so-called stress whitening. Stress whitening refers to microscopically small areas whose boundary surfaces are bridged with individual extremely stretched material strands and which become visible as milky-white discolorations. Stress whitening is thus an initial damage of the material and may be the beginning of complete material failure. In order to counteract this, the invention proposes the two-part configuration of the cap, where the two parts of the cap are coupled with each other by an elastically formed connecting bridge. This elastic connecting bridge enables in operation a height compensation in vertical direction so that the terminals of the positive plates can migrate and stress whitening is avoided.

According to a further feature of the invention, it is provided that the cap is arranged with an anti-rotation connection on the terminal. This protects the terminal from a possible cell connector break, in particular in case of a configuration with a corresponding screw connection for contacting a connecting cable.

Typically, for contacting a connecting cable on the respective terminal, it is provided that the connecting cable is to be screw-connected to the terminal. This screw-on action is realized with application of a torque of, for example, 20 Nm. The abutment for the screw is formed by the terminal or a threaded sleeve received in the terminal and comprised of nonferrous metal. The terminal is supported, in turn, on the cell connector and thus on the corresponding electrode plates, wherein the connection of the electrode plates with the cell connector is realized only by the respective contact tabs which constitute a particular weak link. In case of proper attachment of a connecting cable by means of the corresponding screw on the terminal, particularly in case of comparatively narrow batteries, i.e., those that comprise only a few electrode plates, it may happen that the contact tabs of the individual electrode plates that are connected to the cell connector bend or even tear off at the moment of torque application. In order to counteract this problem, the invention proposes to arrange the cap with anti-rotation fixation on the terminal. This anti-rotation arrangement ensures that, when screwing in a connecting screw for connecting a connecting cable, the introduced torque is introduced by means of the anti-rotation contact of cap and terminal into the cap and from there via the weld connection into the casing cover. In this way, the risk of contact tabs and/or cell connectors possibly breaking off is eliminated.

The anti-rotation connection of the cap and the terminal can be realized, for example, in that the cap has a slot which is extending in the vertical direction or height direction of the cap and which is engaged by a sword-like projection of the terminal. In this way, a form-fit connection between the cap, on the one hand, and the terminal, on the other hand, is formed. This connection is capable of transmitting torque so that dissipation into the casing cover or the casing box which is fused thereto can be realized. In this connection, the configuration of the sword-like projection on the terminal has moreover the advantage that the terminal can also be produced in the context of the afore described COS method.

The invention as a whole proposes a construction which, compared to the prior art, enables a significantly improved terminal sealing action in conjunction with simultaneous use of the COS method for terminal manufacture so that the use of an inexpensive manufacturing process that is easy to carry out is provided.

BRIEF DESCRIPTION OF THE DRAWING

Further features and advantages of the invention result from the following description with the aid of the drawings.

FIG. 1a is a schematic side view of a battery cell according to the invention with cutaway portions.

FIGS. 1b and 1c show section views of the battery cell of FIG. 1a.

FIG. 1d is a top view of the battery cell of FIG. 1a.

FIG. 4 is a schematic side view of the cap according to FIG. 2.

FIG. 5 is a sectioned side view of the cap according to FIG. 4 according to the section line V-V.

FIG. 6 shows in a schematic side view the cap of FIG. 4 in a position rotated by 90° relative to FIG. 4.

DESCRIPTION OF THE PREFERRED EMBODIMENTS

Figure 2:
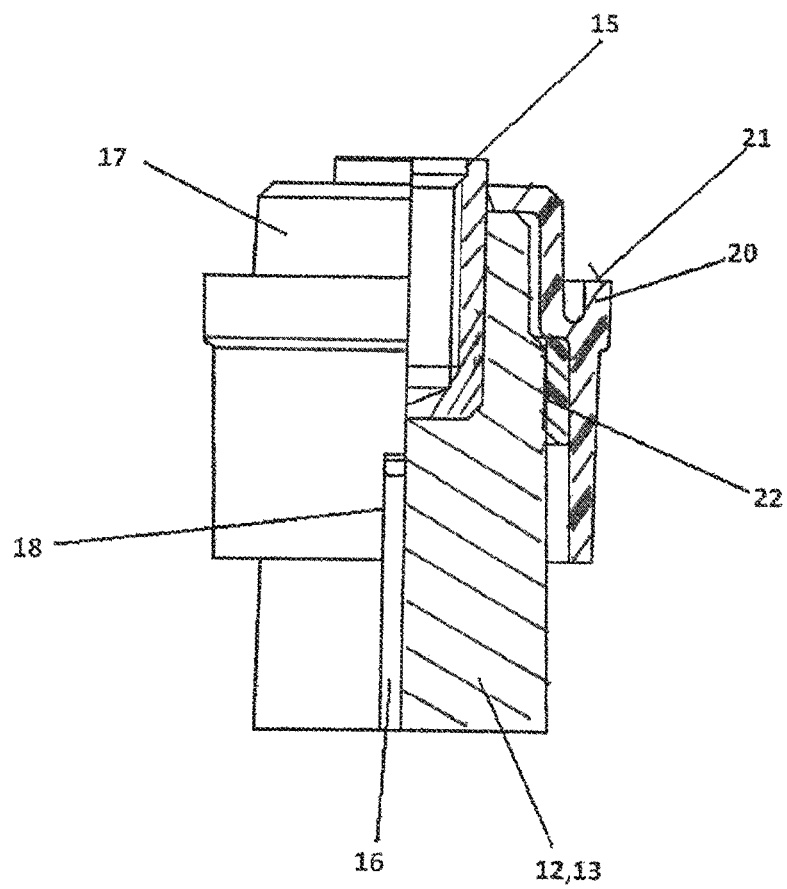
FIG. 2 is a partially sectioned side view of a terminal provided with a cap.

FIGS. 1a to 1d show in schematic illustrations a battery cell 1 according to the invention.

The battery cell 1 comprises a casing 2. The casing 2 comprises a casing box 4 and a casing cover 5 that in the final mounted state fluid-tightly closes off the casing box 4. The casing box 4 and the casing cover 5 are preferably connected by welding or fusing to each other.

Within the casing 2, an electrode plate pack 3 is arranged. The pack 3 is comprised of alternatingly arranged positive electrode plates 6 and negative electrode plates 7. The electrode plates 6 and 7 comprise contact tabs at the side facing the casing cover 5, wherein the positive electrode plates 6 are provided with contact tabs 8 and the negative electrode plates 7 are provided with contact tabs 9. By means of a common cell connector 10 or 11, respectively, the contact tabs 8 or contact tabs 9 are electrically coupled to each other. Each cell connector 10 or 11 supports a terminal 12 or 13, wherein the cell connector 11 of the negative electrode plates 7 supports the negative terminal 12 and the cell connector 10 of the positive electrode plates 6 supports the positive terminal 13.

The terminals 12 and 13 pass through appropriate cover openings 26 within the casing cover 5 so that the terminals 12, 13 are accessible from the exterior of the casing 2 for appropriate contacting. In the illustrated embodiment, connectors 14 of cabling, not illustrated in more detail, are screw-connected with the terminals 12, 13, respectively, for which purpose the terminals 12 and 13 are provided with threaded sleeves 15, not illustrated in detail in FIGS. 1a to 1d.

For a fluid-tight lead-through of the terminal through the cover, the terminals 12, 13 comprise a cap 17 which at the side facing the terminal is provided with a sealing element 22 and at the side facing the casing cover is welded to the casing cover 5. This can be seen in detail particularly when looking at FIGS. 2 to 9.

FIG. 2 discloses a terminal 12, 13. The terminal 12, 13 is made by casting from lead material. A threaded sleeve 15 of nonferrous metal is embedded by casting in the lead material. This threaded sleeve 15 serves for receiving a connecting screw for electrical contacting of the terminal 12 or 13 with a connector 14 provided at a current-conducting cable.

The terminal 12, 13 carries a cap 17 placed thereon. This cap 17 is comprised of a plastic material, preferably polypropylene. The cap 17 is arranged with anti-rotation connection on the terminal 12 or 13 which is achieved in that the terminal 12 or 13 is provided with a radially extending projection 16 which in the embodiment is designed like a sword. This projection 16 engages with form fit a slot 18 provided in the wall of the cap 17.

Figure 3:
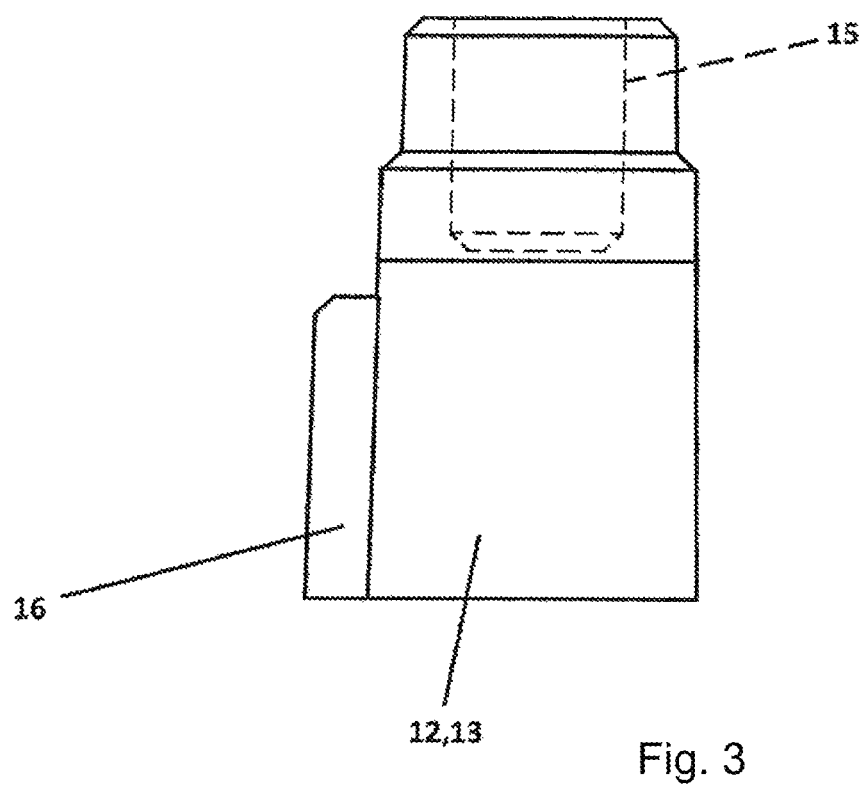
FIG. 3 is a schematic side view of the terminal according to FIG. 2.

FIG. 3 illustrates the configuration of the projection 16 in detail.

FIGS. 4 to 6 show the cap 17 in detail. As can be seen from the Figures, the cap 17 comprises a first part 24 and a second part 25. In the final mounted state, the second part 25 is contacting the head of the corresponding terminal 12 or 13. The second part 25 provides an insertion opening 19 through which a connecting screw for insertion into the threaded sleeve 15 is to be guided.

The first part 24 of the cap 17 provides at its circumference a circumferentially extending support web 20. In the final mounted state, the casing cover 5 is positioned with its inner side on the support surface 21 provided on the support web 20.

In the final mounted state, the cap 17 receives an annular sealing element 22 as can be seen in the illustration of FIG. 5. In this context, the sealing element 22 is arranged at the inner side of the cap 17 and positionally secured on the circumferentially extending shoulder 23.

Figure 8:
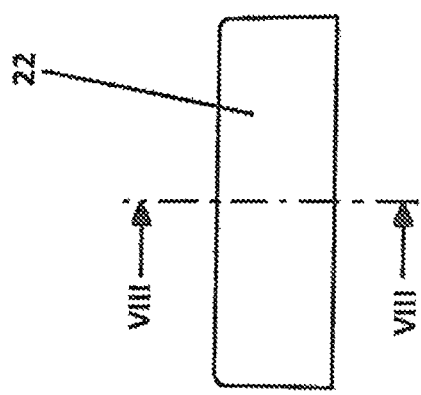
FIG. 8 is a sectioned side view of the sealing element according to FIG. 7 according to section line VIII-VIII.
Figure 7:
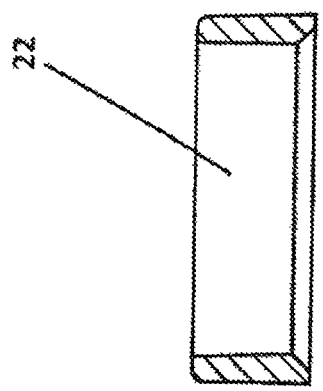
FIG. 7 is a schematic side view of a sealing element.

The sealing element 22 is illustrated in detail in FIGS. 7 and 8. It is comprised preferably of plastic material, namely of a thermoplastic elastomer.

Figure 9:
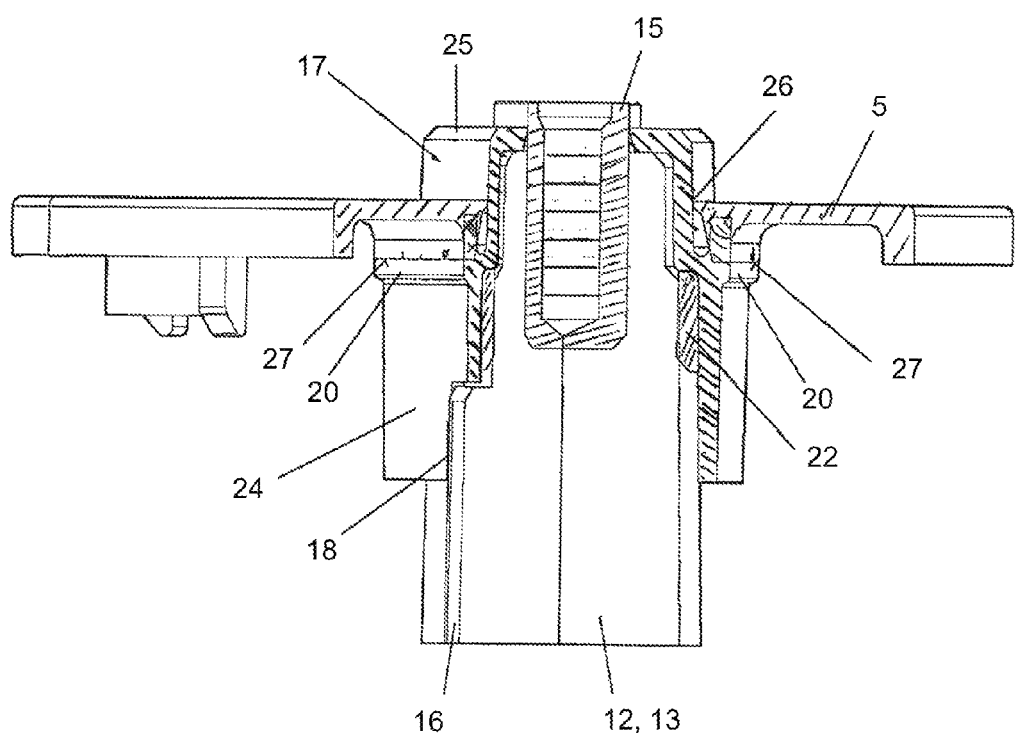
FIG. 9 is a schematic perspective detail view of the assembled state.

FIG. 9 illustrates an assembled state. The cap 17 is placed onto the terminal 12 or 13. The second part 25 of the cap 17 is contacting, positionally secured, the head of the terminal 12 or 13 and the threaded sleeve 15 extends through the insertion opening 19 provided in the second part 25 of the cap 17. The projection 16 which is preferably monolithically formed together with the terminal 12 or 13 engages the slot 18 provided in the first part 24 of the cap 17 so that the cap 17 is contacting with anti-rotation action the terminal 12, 13.

The sealing element 22 which is received in the first part 24 of the cap 17 is contacting the terminal 12, 13 so that a fluid-tight closure is provided.

The support web 20 provided on the outer circumference of the second part 25 of the cap 17 is positioned on a collar 27 formed on the inner side of the casing cover 5 wherein the support web 20 is connected fluid-tightly with the collar 27, preferably welded or fused thereto.

As a result of the sealing element 22 which is arranged between the terminal 12, 13 and the cap 17 and the fused or welded connection of the support web 20 of the cap 17 with the collar 27 of the casing cover 5, a fluid-tight and thus electrolyte-tight lead-through of the terminal 12 or 13 through the corresponding cover opening 26 in the casing cover 5 is achieved as a whole.

Figure 10:
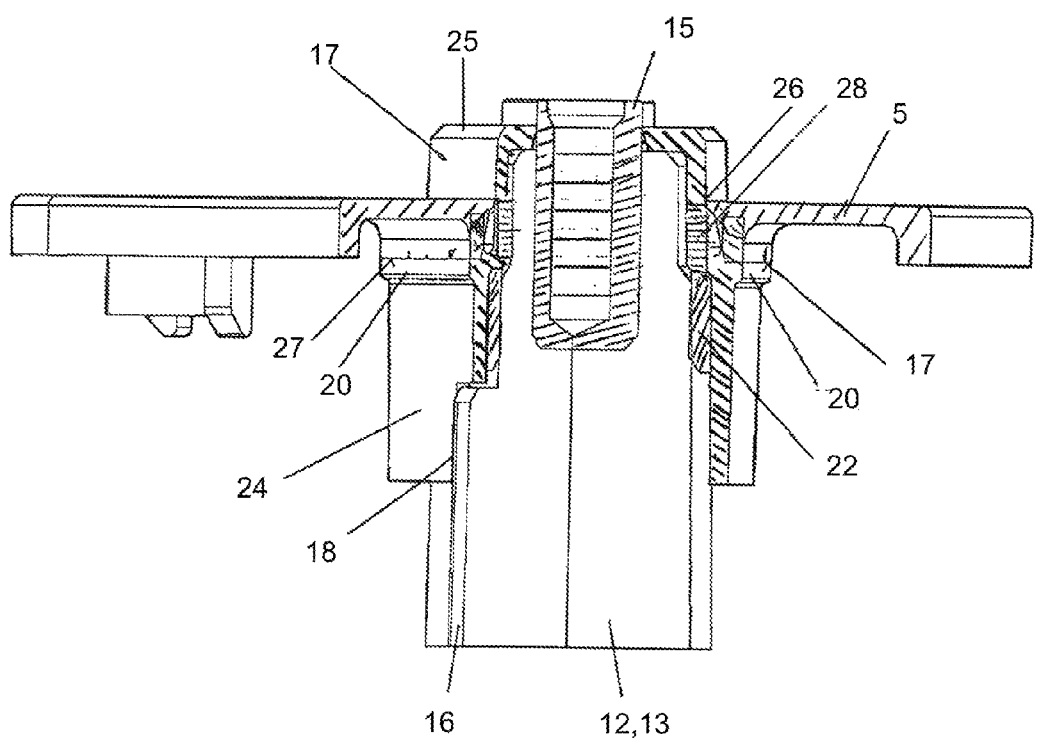
FIG. 10 shows an embodiment of the cap with connecting bridge.

In the illustrated embodiment, the first part 24 and the second part 25 of the cap 17 form a monolithic component. As an alternative to this embodiment, it can be provided that the first part 24 and the second part 25 of the cap 17 are each formed as separate components and are axially spaced apart from each other with interposition of an elastically embodied connecting bridge 28 (FIG. 10). Such a configuration provides the advantage that the upper second part 25 of the cap 17 can migrate in vertical direction of the cap, i.e., can move relative to the first part 24 or relative to the casing cover 5. This permits the unavoidable growth of the positive terminal 12 during proper utilization while avoiding stress whitening.

A special advantage of the configuration according to the invention is that possible geometric tolerances in regard to the relative orientation of the terminals, on the one hand, and of the casing cover 5 or the cover openings 26 provided therein, on the other hand, are not compensated by the sealing element 22 but by the position of the cap 17. In this way, a permanent reliable sealing action of the terminal 12 or 13 relative to the cap 17 by means of the sealing element 22 is ensured.

The specification incorporates by reference the entire disclosure of European priority document 14 177 887.8 having a filing date of Jul. 21, 2014.

While specific embodiments of the invention have been shown and described in detail to illustrate the inventive principles, it will be understood that the invention may be embodied otherwise without departing from such principles.

LIST OF REFERENCE NUMBERS 1 battery
2 casing
3 electrode plate pack
4 casing box
5 casing cover
6 positive electrode plate
7 negative electrode plate
8 contact tab
9 contact tab
10 cell connector
11 cell connector
12 negative terminal
13 positive terminal
14 connector
15 threaded sleeve
16 projection
17 cap
18 slot
19 insertion opening
20 support web
21 support surface
22 sealing element
23 shoulder
24 first part
25 second part
26 cover opening
27 collar
28 connecting bridge

What is claimed is:

1. A battery cell for a battery comprising:
a casing comprising a casing box with an open side and a casing cover closing off the open side of the casing box fluid-tightly;
an electrode plate pack disposed in the casing box and comprising a terminal comprised of lead material and extending through a cover opening provided within the casing cover;
a cap comprised of plastic material and placed onto the terminal;
the cap comprising an inner side provided with a circumferentially extending shoulder, further comprising an exterior side provided with a circumferentially extending support web, and further comprising an insertion opening;
a sealing element arranged between the cap and the terminal, wherein the sealing element is arranged at the inner side of the cap and is positionally fixed by resting on the circumferentially extending shoulder of the cap;
the casing cover resting on the circumferentially extending support web of the cap;
the cap and the casing cover welded to each other in a contact area where the support web and the casing cover are contacting each other;
a threaded sleeve comprised of nonferrous metal and embedded in the lead material of the terminal, wherein the threaded sleeve is aligned with the insertion opening of the cap and is configured to receive a connecting screw to be passed through the insertion opening of the cap.

2. The battery cell according to claim 1, wherein the plastic material of the cap is polypropylene.

3. The battery cell according to claim 1, wherein the sealing element is comprised of plastic material.

4. The battery cell according to claim 3, wherein the sealing element is comprised of a thermoplastic elastomer.

5. The battery cell according to claim 1, wherein the cap comprises a first part and a second part, wherein the first part is welded to the casing cover and the second part is axially spaced apart from the first part, wherein between the first part and the second part an elastic connecting bridge is arranged.

6. The battery cell according to claim 1, wherein the cap is arranged with an anti-rotation connection on the terminal.

7. The battery cell according to claim 6, wherein the anti-rotation connection comprises a slot provided in a wall of the cap and extending in a vertical direction of the cap and further comprises a projection provided on the terminal and engaging the slot.

8. The battery cell according to claim 1, wherein the projection is formed monolithically together with the terminal.

9. A traction battery comprising a plurality of battery cells according to claim 1, the battery cells connected to each other.

\* \* \* \* \*